United States Patent
Andersson

[19]

[11] Patent Number: 5,885,640
[45] Date of Patent: Mar. 23, 1999

[54] METHOD AND APPARATUS FOR INTRODUCING AROMA INTO FOOD PACKAGE AND FOOD PACKAGE CONTAINING SAID AROMA

[75] Inventor: Bo Andersson, Oxie, Sweden

[73] Assignee: Nestec S.A., Vevey, Switzerland

[21] Appl. No.: 873,367

[22] Filed: Jun. 12, 1997

[30] Foreign Application Priority Data

Jun. 17, 1996 [EP] European Pat. Off. ............ 962016861

[51] Int. Cl.[6] ........................................ A23B 4/14
[52] U.S. Cl. .................. 426/316; 426/106; 426/129; 426/312; 426/319; 426/388; 426/392; 426/394; 426/404; 426/418; 99/467; 99/468; 99/472; 99/473; 53/79; 53/86; 53/403; 53/428; 53/432
[58] Field of Search .................... 426/106, 112, 426/129, 312, 316, 319, 386, 388, 392, 394, 396, 397, 404, 418, 574; 99/467, 468, 472, 473; 53/510, 79, 403, 428, 432, 86

[56] References Cited

U.S. PATENT DOCUMENTS

| | | | |
|---|---|---|---|
| 3,360,382 | 12/1967 | Miller | 426/316 |
| 3,549,389 | 12/1970 | Peterson | 426/129 X |
| 3,695,900 | 10/1972 | Young et al. | 426/129 X |
| 4,409,252 | 10/1983 | Buschkens et al. | 426/316 X |
| 4,685,274 | 8/1987 | Garwood | 426/129 X |
| 4,831,811 | 5/1989 | Nixon, Jr. et al. | 426/316 X |
| 4,919,955 | 4/1990 | Mitchell | 426/129 X |
| 5,481,852 | 1/1996 | Mitchell | 426/129 X |
| 5,744,182 | 4/1998 | Andersson et al. | 426/316 |

FOREIGN PATENT DOCUMENTS

| | | |
|---|---|---|
| 0702964 | 3/1996 | European Pat. Off. . |
| 0 706 944 | 4/1996 | European Pat. Off. . |

Primary Examiner—Milton Cano
Attorney, Agent, or Firm—Pennie & Edmonds LLP

[57] ABSTRACT

The present invention relates to a package which contains a food product and an aromatized headspace. The headspace includes an aromatised food-acceptable inert gas and food-acceptable protective gas. The invention also relates to a process and an apparatus for introducing an aroma into the headspace of a package containing a food product during the gas packing of the food product by introducing a modified atmosphere into the headspace, and introducing a food-acceptable aroma dissolved in or mixed with a gaseous food-acceptable inert gas into the headspace of the package.

20 Claims, 2 Drawing Sheets

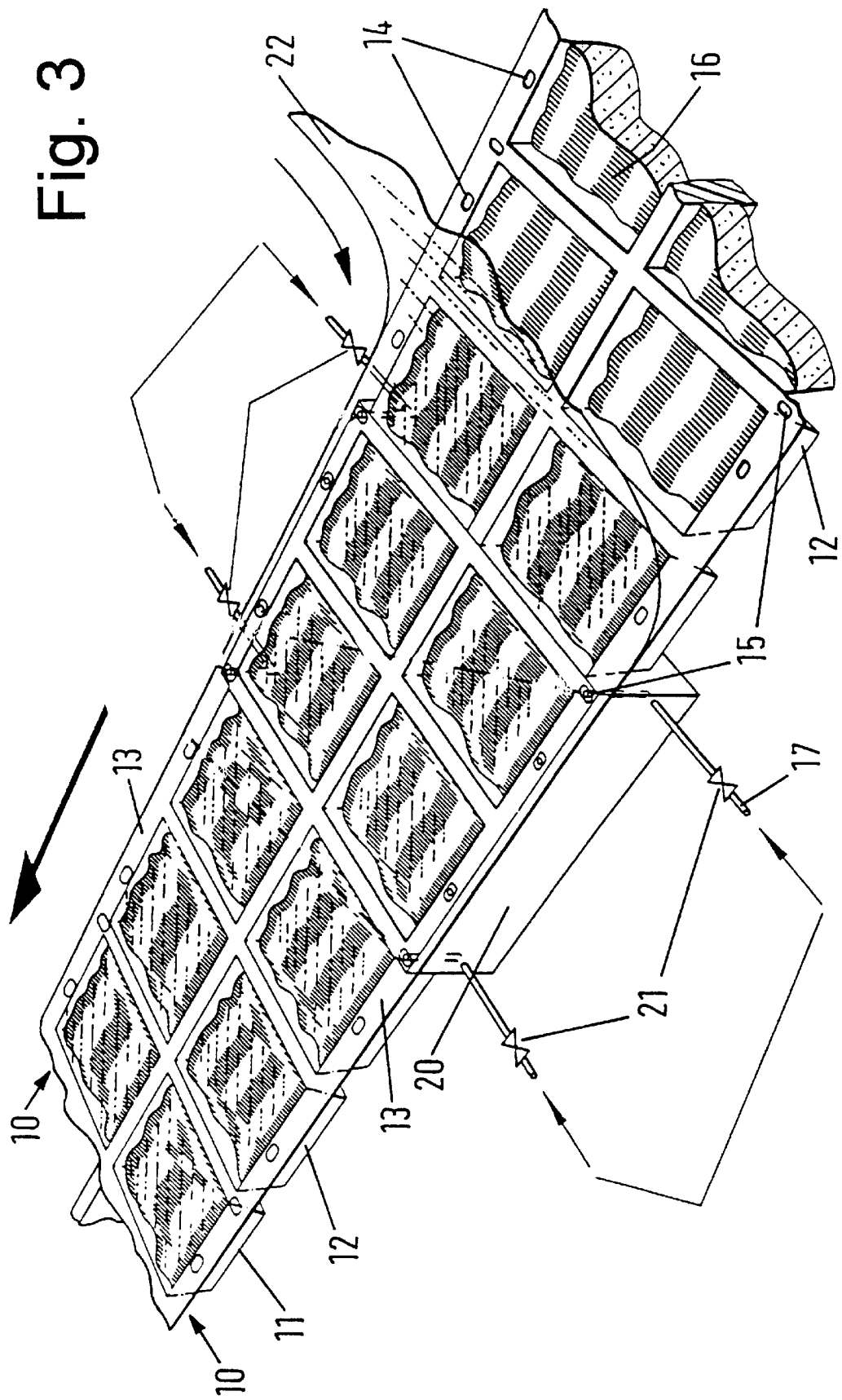

METHOD AND APPARATUS FOR INTRODUCING AROMA INTO FOOD PACKAGE AND FOOD PACKAGE CONTAINING SAID AROMA

TECHNICAL FIELD

The present invention relates to a process and apparatus for introducing an aroma into the headspace of a package containing a food product so that, on opening the package, the consumer will smell the aroma. The invention also relates to a food package comprising a food product and an aromatized headspace. In particular the invention relates to introducing aroma dissolved in or mixed with a food-acceptable inert gas in gas phase into the headspace of a food package.

BACKGROUND ART

In some cases it would be desirable to introduce an aroma or fragrance into the headspace of a food package in order to increase the smell of freshness and to stress the uniqueness of the food product so that, on opening the package, the consumer's appetite will be whetted on smelling the aroma or fragrance.

A system for aromatizing a headspace of a food package is disclosed in European patent 0 706 944, the content of which is hereby incorporated by reference. Although this system provides many advantages, the food-acceptable aromas in this system are dissolved in a liquid food-acceptable gas under pressure. For an injection into a headspace of a food package of this aroma dissolved in a liquid gas, the liquid gas and aroma must be dispensed e.g. by means of spraying nozzle as described in the above cited patent or by means of a dispenser for aroma gas as discussed in European Patent Application 0 702 964 A1.

SUMMARY OF THE INVENTION

In an attempt to simplify the prior art, we have surprisingly found that a noble or inert gas may be aromatized and used for introducing an aroma into the headspace of a food package to impart a desirable aroma and increase the smell of freshness on opening the package. It has been found that the aromatized inert gas may be stored under a pressure of 6 to 10 bars. This means that the mixture is not liquid as is the case in the prior art discussed above but is in a gaseous phase. This allows for a direct mixing of the aromatized inert gas with gases used for modifying atmosphere such as carbon dioxide or nitrogen or mixtures thereof. It has been observed that mixing may be done with a conventional gas mixer in a pre-selected proportion. The mixed aromatized food-acceptable inert gas and the modified atmosphere may then be injected into food packages using commercially available gas packing machines.

According to the present invention there is provided a process for introducing an aroma into the headspace of a package containing a food product during the gas packing of the food product comprising introducing a modified atmosphere into the headspace, and introducing a food-acceptable aroma dissolved in or mixed with a gaseous food-acceptable inert gas into the headspace of the package.

The process of the present invention may be carried out using any commercial available gas packing machines, e.g. automatic, semi-automatic or manual vacuum/modified atmosphere packing machines (Multivac™, Tiromat™, Dixie Union™, etc.), automatic or semi-automatic form-fill-seal machines (horizontal or vertical), or automatic or manual pouch packing machines. Commercial available gas mixers which are suitable can be used for carrying out the invention are e.g. gas mixers from Alfax and Multivac.

The food product may advantageously be a chilled product, e.g. charcuterie, packed in a modified atmosphere, for instance in a pouch or it may be a product suitable for ambient storage, e.g. a confectionery product such as biscuits.

Food-acceptable aroma is preferably of natural origin, is volatile and is preferably not substantially absorbed by the food product. Advantageously, the fragrance of the aroma is similar to the fragrance of the food product in the package, e.g. meaty fragrance for a meat product such as charcuterie. The aroma should be soluble or mixable in gaseous food-acceptable inert gas.

The food-acceptable gas should be a noble or inert gas selected from the group of helium (He), neon (Ne), argon (Ar), krypton (Kr), and xenon (Xe). Preferably the food-acceptable gas is argon which is most economical in use. The advantages of using an inert gas are to make easier the distribution and dosing as discussed; from this comes the convenience of having all gases at about the same pressure which gives freedom in mixing and injecting of the gas mixtures or the injection of the gases separately where appropriate.

A further advantages of applying an aromatized inert gas to a headspace of a food package is that the noble or inert gas does not dissolve into the food product to the same extent as e.g. carbon dioxide or nitrogen. Therefore, the present invention provides a longer lasting in-pack aroma.

The introduction of the modified atmosphere into the headspace may be accomplished by firstly evacuating the air from the package followed by introducing the modified atmosphere and the aromatized inert gas. Evacuating air from the package is accomplished by pulling a vacuum which is a conventional process as is the introduction of the modified atmosphere which usually consists of carbon dioxide or nitrogen or any mixture thereof, e.g. 20% $CO_2$ and 80% $N_2$. The aromatized gas may be mixed with the modified atmosphere before being introduced into the head space of the food package. Alternatively, the aromatized gas and the modified atmosphere may be dosed separately.

In an alternative embodiment of the invention, the modified atmosphere and the aromatized inert gas may be introduced by gas flushing which causes the air in the package to be replaced by the modified atmosphere. In this embodiment of the invention, it is preferred that the dosing of the aromatized inert gas is made separately. Advantageously, the aromatized inert gas is dosed shortly after the modified atmosphere is introduced into the headspace.

Preferably, the food-acceptable aroma is dissolved in a food-acceptable organic solvent or gas before it is dissolved or mixed in the liquid food-acceptable inert gas. Examples of organic solvents are alcohols such as ethyl alcohol or animal or plant oils, e.g. peanut oil. The amount of aroma dissolved in the solvent may be from 1 to 30%, for instance from 5 to 20% by weight based on the weight of the solution.

The aromatized food-acceptable inert gas is conveniently held in a gas container such as a gas bottle or gas cylinder, preferably under a pressure which is in the range from 2 to 10 bars, preferably about 6 bars.

The amount of food-acceptable aroma in the food-acceptable inert gas may be from 0.1 to 15%, for instance 0.5 to 10%, preferably about 1% by weight, based on the weight of the gas.

It is preferred that to amount of the aromatized inert gas and the modified atmosphere are usually from 5 to 40%, for instance from 10 to 30% of the headspace.

In another aspect, the present invention relates to a package or container comprising a food product and a headspace wherein said headspace comprises an aromatized food-acceptable inert gas and food-acceptable protective gas. The aromatized inert gas may be as described above, and the protective gas or the modified atmosphere of conventional type e.g. carbon dioxide, nitrogen or a mixture thereof. The food package may e.g. comprise a chilled charcuterie product such as sliced meat, sausages, a dough or a biscuit product, or combined dough, meat and sauce product for example pies. Advantageously, the pressure in the package is slightly pressurised e.g. 1.5 to 1.1 atmosphere. This promotes spreading of the aromatized gas around the package upon opening it.

The present invention also relates to an apparatus for introducing an aroma into the headspace of a package comprising a food product during the gas packing of the food product which comprises means for introducing a modified atmosphere into the headspace, and means for introducing the food-acceptable aroma dissolved in or mixed with a gaseous food-acceptable inert gas into the headspace of the package. The apparatus preferably being of the type referred to above, will be discussed in further detail in relation to the drawings.

It will be apparent to a person skilled in the art that the present invention is not limited to the packing of food products. The invention may also be useful in the gas packing of beverages and to containers containing beverages, thus allowing an increase of the smell of freshness of the beverage product and a stressing of the uniqueness of the beverage.

BRIEF DESCRIPTION OF THE DRAWINGS

The invention will now be described in further detail by reference to the accompanying drawings by way of example only and in which FIG. 3 is a perspective view of an aromatized inert gas and modified atmosphere being introduced into filled trays at a sealing station using fixed nozzles.

DETAILED DESCRIPTION OF THE PREFERRED EMBODIMENTS

Figure 1:
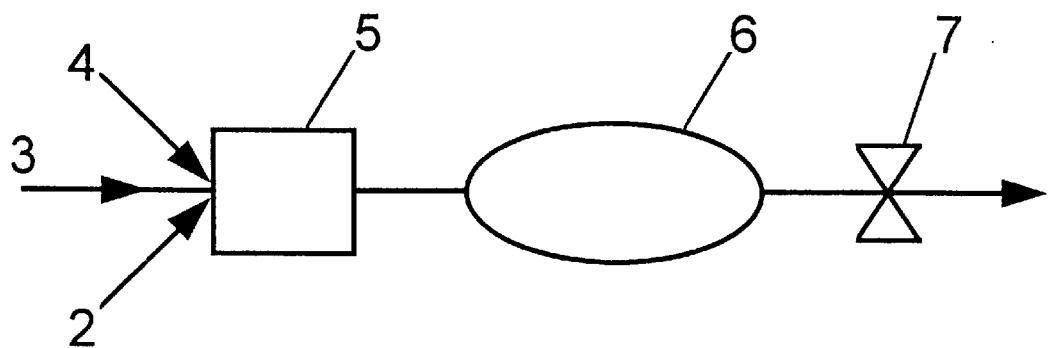
FIG. 1 is a schematic drawing of a mixing system according to the invention wherein the aromatized inert gas and the modified atmosphere are injected into a food package together.

FIG. 1 shows a mixing system according to the invention wherein the aromatized inert gas and the modified atmosphere are injected into a food package together. Aromatized inert gas 2 is delivered to the packing area e.g. in cylinders. The aromatized inert gas supply is connected to a gas mixer 5. Nitrogen and carbon dioxide supplies 3, 4 are also connected to the gas mixer 5 which mixes the gases for a buffer supply tank 6 from which it is ready for dosing into the packs being advanced in the packing machine. The buffer tank 6 has the advantage that the gases are well mixed and a better blend is provided in the gas injection. The dosing from the supply tank or chamber is controlled by means of a valve 7. The valve may of commercial type, for example magnet solenoid valve of conventional type.

Figure 2:
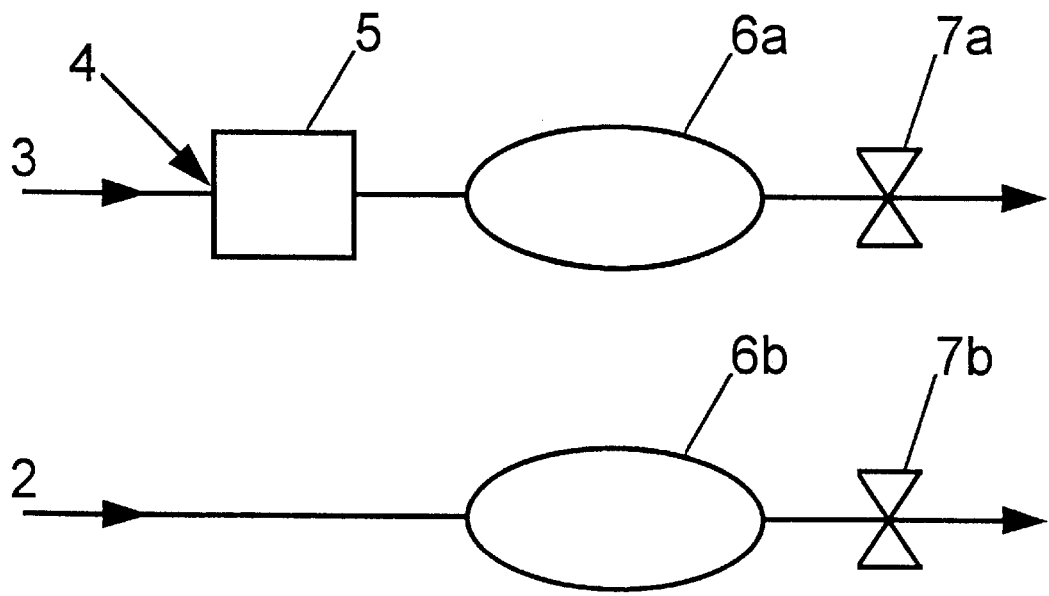
FIG. 2 is a schematic drawing of a mixing system according to the invention in which the injection of the aromatized inert gas and the modified atmosphere are injected separately.

An alternative to the dosing system shown in FIG. 1 is shown in FIG. 2. In this embodiment the invention the injection of the aromatized inert gas and the modified atmosphere are injected separately. The aromatized inert gas 2 is supplied, e.g. via a tube preferably in stainless steel, to a buffer tank 6b. From this buffer tank the aromatized inert gas is dosed into the packages. The dosing is controlled by a valve 7b of the above type. Nitrogen and carbon dioxide supplies 3, 4 are connected to a gas mixer 5 which mixes the gases for a buffer supply tank 6a from which it is ready for dosing into the packs via e.g. a solenoid valve 7a.

Referring now to FIG. 3, each package comprises a bottom web in the form of a tray 10 having a bottom 11, side walls 12 and a continuous flange 13 extending laterally from the upper edge of the side walls. The flange 13 is formed with pre-punched holes 14 for vacuum and modified atmosphere and pre-punched holes 15 for aromatized inert gas. Such an arrangement is suitable for the FIG. 2 injection system. Alternatively, one or both holes 14 and 15 may be used for mixtures of aromatized inert gas and modified atmosphere gas, which is convenient for the FIG. 1 system. The trays may be constructed of a food-acceptable plastics material such as polypropylene, polyethylene, polystyrene or polyvinyl chloride or other materials which as cardboard or aluminum foil. The trays are filled with slices of cooked ham 16 and are transported on the conveyor means (not shown) adapted to travel intermittently.

Stainless steel tubes 17 connected at one end to a gas supply, e.g. containing a meat-flavored food-acceptable aroma dissolved in inert gas in gas phase, and kept under a pressure of 6 bars. Solenoid valves 21 are positioned along the lengths of the tubes 17 and are controlled by the packaging machine. A top web 22 made of a flexible plastic material is shown sealed to the flange 13 of some of the trays.

In operation, the filled trays 10 arranged in two rows are conveyed intermittently in the direction of the arrow to the sealing station 20 where a group of four (two rows of two) stop.

In the embodiment shown in FIG. 3, just before the top web 22 is sealed to the flange 13, a vacuum is pulled through the pre-punched holes 14 to evacuate air in the headspace and simultaneously there are introduced into the headspace a modified atmosphere consisting of 20% $CO_2$ and 80% $N_2$ through the pre-punched holes 14 and aromatized inert gas from the gas bottles via the tubes 17 through the valve, through the pre-punched holes 15 controlled by a signal from the solenoid valves 21. Afterwards, the top web 22 is sealed to the flange 13.

What is claimed:

1. A process for introducing an aroma into a package containing a food product and having a headspace above the food product, the aroma being introduced during the gas packing of the food product in the package, the process comprising introducing a modified atmosphere into the headspace, and introducing a food-acceptable aroma dissolved in or mixed with a gaseous food-acceptable inert gas into the headspace of the package.

2. A process according to claim 1, wherein the food product is a chilled charcuterie product and the food-acceptable aroma is a meat-flavored aroma.

3. A process according to claim 1, wherein the introduction of the modified atmosphere into the headspace is accomplished by firstly evacuating the air from the package followed by introducing the modified atmosphere and the aromatized food-acceptable inert gas therein.

4. A process according to claim 1, wherein the introduction of the modified atmosphere into the headspace is accomplished by gas flushing which causes air in the package to be replaced by the modified atmosphere.

5. A process according to claim 1, wherein the inert gas is selected from the group consisting of helium, neon, argon, krypton, and xenon.

6. A process according to claim 1, wherein the food-acceptable aroma is volatile and is not substantially absorbed by the food product.

7. A process according to claim 1, wherein the food-acceptable aroma is dissolved in or mixed with a food-acceptable organic solvent or gas before it is dissolved in or mixed with the inert gas.

8. A process according to claim 1, wherein the gaseous food-acceptable inert gas containing the food-acceptable aroma is introduced at the same time as the modified atmosphere in the headspace of the package.

9. A process according to claim 1, wherein gaseous food-acceptable inert gas containing the food-acceptable aroma is introduced separately from the modified atmosphere into the headspace of the package.

10. A package for a food product comprising a sealed tray containing a food product and having a headspace above the food product, which headspace includes an aromatized food-acceptable inert gas and food-acceptable protective gas therein.

11. A package according to claim 10 wherein the inert gas is selected from the group consisting of helium, neon, argon, krypton, xenon, and a mixture thereof.

12. A package according to claim 10, wherein the food-acceptable protective gas is carbon dioxide, nitrogen or a mixture thereof.

13. A package according to claim 10, wherein the food product is a chilled charcuterie product.

14. An apparatus for introducing an aroma into a package containing a food product and having a headspace above the food product, the aroma being introduced during the gas packing of the food product in the package, which apparatus comprises means for supplying a modified atmosphere means for supplying a food-acceptable aroma contained in a gaseous food-acceptable inert gas, and means for introducing the modified atmosphere and aroma-containing inert gas into the headspace of the package.

15. The apparatus of claim 14 wherein the introducing means comprises a first tank for receiving the modified atmosphere, a first pipe operatively associated with the package for directing the modified atmosphere thereto, and a first valve for controlling the introduction of the modified atmosphere into the package.

16. The apparatus of claim 15 wherein the introducing means further comprises a second tank for receiving the aroma-containing inert gas, a second pipe operatively associated with the package for directing the aroma-containing inert gas thereto, and a second valve for controlling the introduction of the aroma-containing inert gas into the package.

17. The apparatus of claim 14 wherein the introducing means comprises a tank for mixing the modified atmosphere and aroma-containing inert gas to form a gas mixture, a pipe operatively associated with the package for directing the gas mixture thereto, and a valve for controlling the introduction of the gas mixture into the package.

18. The apparatus of claim 14 further comprising means for evacuating air from the package prior to introducing the modified atmosphere and aroma-containing inert gas therein.

19. The apparatus of claim 14 which further comprising means for sealing the package after introducing the modified atmosphere and aroma-containing inert gas therein.

20. The apparatus of claim 19 wherein the package is made of plastic and the sealing means seals a plastic web to the package above the headspace.

* * * * *